United States Patent
Robinson et al.

(10) Patent No.: US 7,406,624 B2
(45) Date of Patent: Jul. 29, 2008

(54) METHOD FOR RESPONDING TO A CONTROL MODULE FAILURE

(75) Inventors: Timothy A. Robinson, Avon, IN (US); James H. Stewart, Gulfport, MS (US)

(73) Assignee: General Motors Corporation, Detroit, MI (US)

( * ) Notice: Subject to any disclaimer, the term of this patent is extended or adjusted under 35 U.S.C. 154(b) by 622 days.

(21) Appl. No.: 11/058,503

(22) Filed: Feb. 15, 2005

(65) Prior Publication Data

US 2006/0184827 A1    Aug. 17, 2006

(51) Int. Cl.
G06F 11/00    (2006.01)
(52) U.S. Cl. .......................................... 714/23; 714/24
(58) Field of Classification Search ................... 714/23, 714/24, 32, 36; 701/35, 29
See application file for complete search history.

(56) References Cited

U.S. PATENT DOCUMENTS

| | | | | |
|---|---|---|---|---|
| 5,327,435 A | * | 7/1994 | Warchol | 714/36 |
| 5,351,185 A | * | 9/1994 | Takeuchi et al. | 700/79 |
| 5,682,314 A | * | 10/1997 | Nishino et al. | 701/29 |
| 5,964,813 A | * | 10/1999 | Ishii et al. | 701/35 |
| 6,141,771 A | * | 10/2000 | O'Brien et al. | 714/15 |
| 6,169,944 B1 | * | 1/2001 | Hayasaka | 701/36 |
| 7,254,744 B2 | * | 8/2007 | Dunstan et al. | 714/24 |
| 7,308,609 B2 | * | 12/2007 | Dickenson et al. | 714/36 |
| 2007/0168739 A1 | * | 7/2007 | Wang et al. | 714/36 |

* cited by examiner

Primary Examiner—Marc Duncan

(57) ABSTRACT

A method is provided for saving system information immediately following a hardware or software failure that causes a processor to reset. After failure is imminent and before the processor allows the reset to occur, the processor is instructed to copy a fixed amount of the system stack SRAM, in addition to any processor registers that can be used to determine the reset cause, into a preserved area of SRAM. During the initialization sequence, the preserved area of SRAM is tested, but not overwritten. This allows all of the preserved SRAM data including previous stack contents and register settings at the time of the failure to be available for analysis.

14 Claims, 2 Drawing Sheets

METHOD FOR RESPONDING TO A CONTROL MODULE FAILURE

TECHNICAL FIELD

The present invention is drawn to a method to diagnose and analyze failures of a control module.

BACKGROUND OF THE INVENTION

When a software or hardware failure causes a control module processor to reset, data regarding the cause of the reset is typically lost during the reset process unless external logic analysis or debugging equipment has been connected in anticipation of the failure. Connection to external logic analysis and debugging equipment is not feasible for most problems due to the cost and complexity of the equipment. Additionally, the external logic analysis and debugging equipment often slows down control module processing and causes unwanted electrical disturbances. Finally, it would be impractical to connect external logic analysis or debugging equipment to every vehicle.

SUMMARY OF THE INVENTION

According to a preferred embodiment of the present invention, a method is provided for saving system information immediately following a hardware or software failure that causes a processor to reset. After failure is imminent and before the processor allows the reset to occur, the processor is instructed to copy a fixed amount of the system stack SRAM, in addition to any processor registers that can be used to determine the reset cause, into a preserved area of SRAM.

During the initialization sequence, the preserved area of SRAM is tested, but not overwritten. This allows all of the preserved SRAM data including previous stack contents and register settings at the time of the failure to be available to the application program. The application program may then store these contents to non-volatile memory during initialization. This area is also available to an external tool for diagnosis of the cause of the failure. The external tool can read the contents of the preserved SRAM data, and reconstruct the sequence of commands executed prior to the failure.

Accordingly, a method for diagnosing, analyzing and responding to failures of a control module includes initializing the control module; determining whether a reset of the control module was caused by an unexpected event; copying data recorded prior to the reset of the control module from a first memory device to a second non-volatile memory device if the reset was caused by an unexpected event; and transmitting the data recorded prior to the reset of the control module to an external tool for analysis.

The above features and advantages and other features and advantages of the present invention are readily apparent from the following detailed description of the best mode for carrying out the invention when taken in connection with the accompanying drawings.

DESCRIPTION OF THE PREFERRED EMBODIMENT

Figure 1:
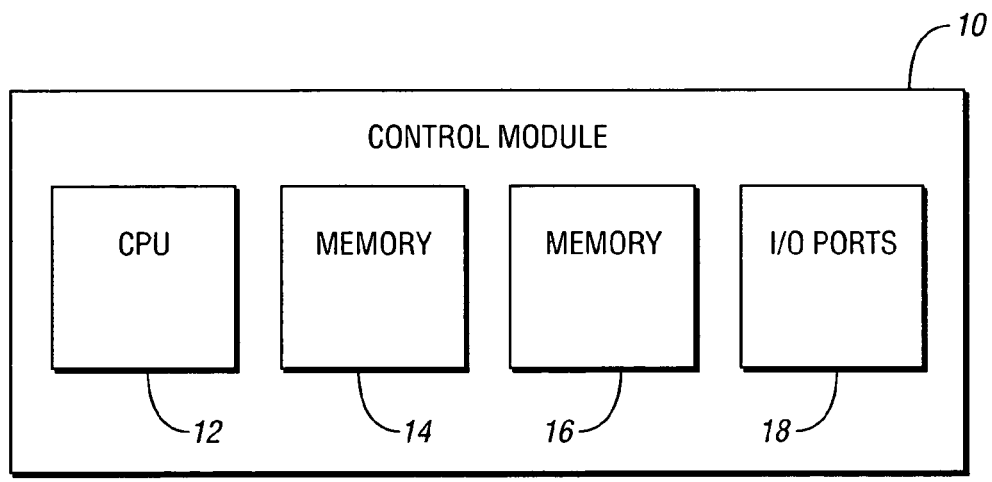
FIG. 1 is a schematic illustration of a maintenance system in accordance with an aspect of the invention.

Referring to the drawings, wherein like reference numerals refer to like components, FIG. 1 shows a control module 10 having a microprocessor 12, a memory device 14, a memory device 16 and one or more input/output ports 18. The control module 10 will hereinafter be described as controlling a vehicle system (not shown). Such systems may include, but are not limited to, a braking system; a fuel storage system; an engine; a heating, ventilating and air conditioning system; a transmission; etc. The memory devices 14 and 16 will hereinafter be described as SRAM 14 and ROM 16 respectively. It should, however, be appreciated that any number of alternate memory devices may be envisioned.

FIGS. 2-5 depict a method of the present invention. More precisely, FIGS. 2-5 show a series of block diagrams representing steps performed by the microprocessor 12.

Figures 2, 3:
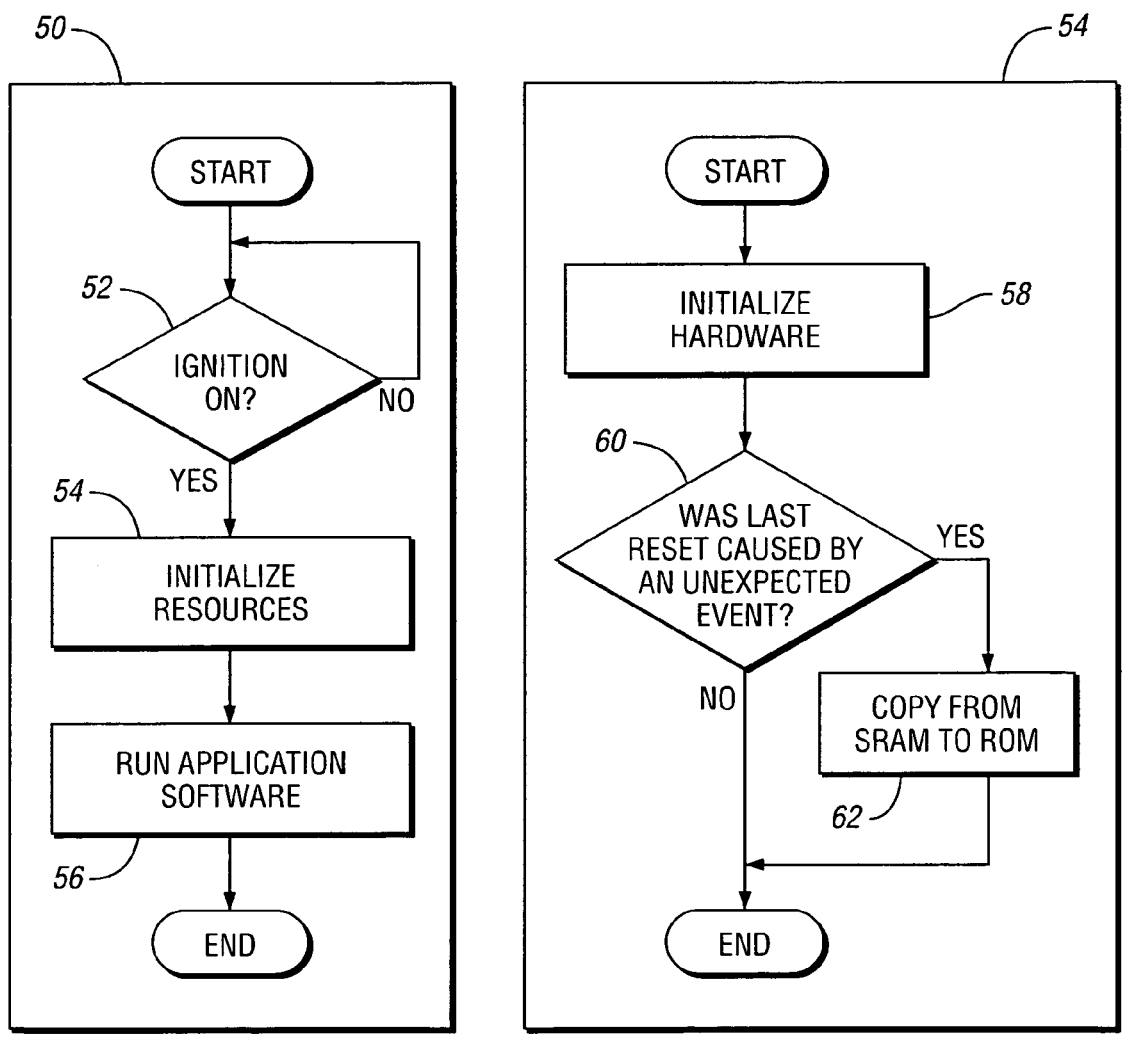
FIG. 2 is a block diagram illustrating a method according to a preferred embodiment of the present invention.
FIG. 3 is a block diagram illustrating a step of the method of FIG. 2.

Referring to FIG. 2, a method 50 (also referred to herein as algorithm 50) to diagnose and analyze failures of a control module is shown. At step 52, the algorithm 50 checks to see if the vehicle's ignition (not shown) is on as preferably indicated by receipt of a vehicle ignition signal. If the ignition is not on, step 52 is repeated. If the ignition is on, the algorithm 50 proceeds to step 54. At step 54, resources are initialized as will be described in detail hereinafter. At step 56, application software is run as will also be described in detail hereinafter.

Referring to FIG. 3, step 54 wherein resources are initialized is shown in more detail. At step 58, hardware devices such as the microprocessor 12, RAM 14 and ROM 16 are initialized. At step 60, the algorithm 50 determines whether the last reset was caused by an unexpected event. An "unexpected event" for purposes of this disclosure includes any event not identified in a predefined list of expected events such as, for example, turning off the vehicle. If the last reset was caused by an unexpected event, the algorithm 50 proceeds to step 62. At step 62, data from a preserved area of SRAM 14 recorded prior to the most recent reset is copied to non-volatile memory such as ROM 16, and thereafter the algorithm 50 proceeds to step 62. The preserved area of SRAM 14 is a predefined memory location as will be described in detail hereinafter. The data copied to non-volatile memory is not lost when the vehicle's ignition is turned off and is available for analysis by an external tool such as a service tool, computer, diagnostic equipment, etc.

Figure 4:
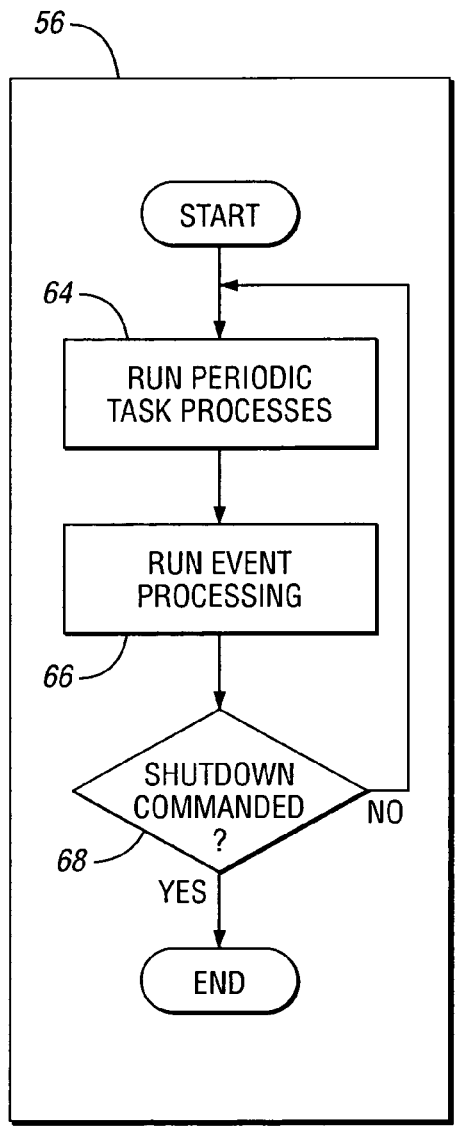
FIG. 4 is a block diagram illustrating a step of the method of FIG. 2.

Referring to FIG. 4, step 56 wherein application software is run is shown in more detail. At step 64, periodic task processes are run. Periodic task processes are specific to each type of control module but may include, for example, controlling shifts, maintaining engine output speed, monitoring throttle position, etc. While the periodic task processes are being run, data recorded prior to an unexpected event can be transmitted from non-volatile memory such as ROM 16 to an external tool. The external tool can then read the recorded data and reconstruct the sequence of commands executed prior to the unexpected event. At step 66, event processing is run. "Event processing" includes the analysis of each reset to determine if it was caused by an unexpected event. At step 68, the algorithm 50 determines whether shutdown has been commanded. If shutdown has not been commanded, the algorithm 50 returns to step 64.

Figure 5:
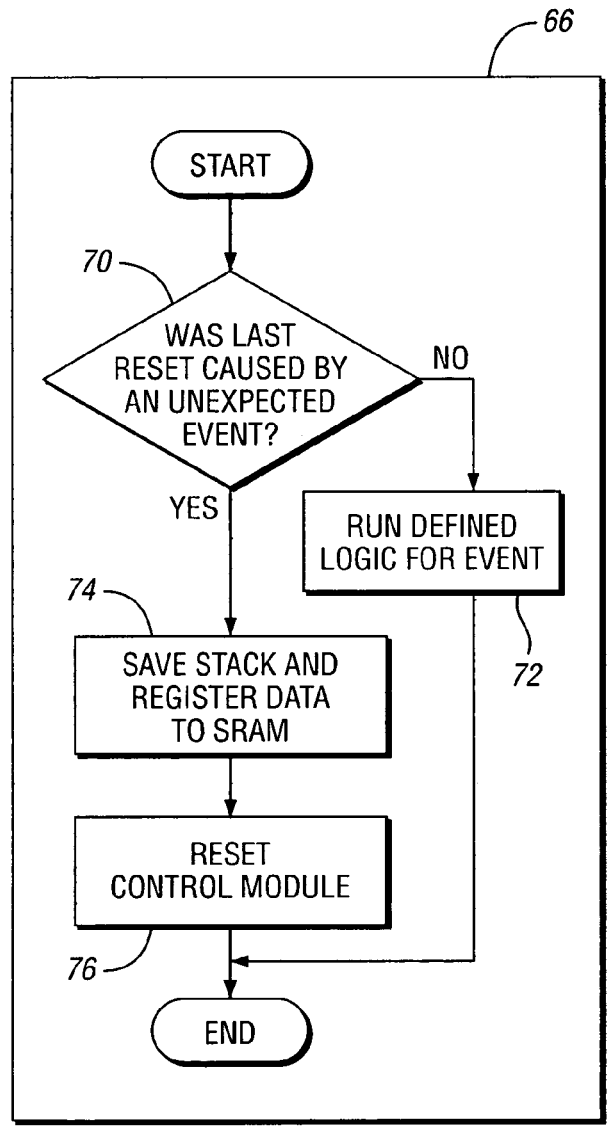
FIG. 5 is a block diagram illustrating a step of the method of FIG. 4.

Referring to FIG. 5, step 66 wherein event processing is run is shown in more detail. At step 70, the algorithm 50 determines if the most recent reset was caused by an unexpected event. If the most recent reset was not caused by an unexpected event, the algorithm 50 proceeds to step 72 wherein a defined logic program is run. When defined logic is run, processing stops so the algorithm 50 can respond to the expected event that caused a reset. Defined logic may include, for example, receiving and processing an engine command transmitted just prior to the reset. If the last reset was caused by an unexpected event, the algorithm 50 proceeds to step 74. At step 74, stack data recorded prior to a reset is copied from a first SRAM 14 memory location to a preserved area of SRAM 14, and register data recorded prior to a recent reset is copied from the microprocessor 12 to the preserved area of SRAM 14. The preserved area of SRAM 14 is a predefined memory location that may be tested but is not overwritten. Therefore, the data recorded prior to the most recent reset and saved in the preserved area of SRAM 14 is temporarily secure and may later be copied to non-volatile memory such as ROM 16 or analyzed by an external tool. At step 76, the control module 10 is reset.

The steps shown in FIGS. 1-5 and described herein need not be performed in the order shown, unless otherwise indicated herein.

While the best mode for carrying out the invention has been described in detail, those familiar with the art to which this invention relates will recognize various alternative designs and embodiments for practicing the invention within the scope of the appended claims.

The invention claimed is:

1. A method for responding to a control module failure comprising:
    initializing the control module;
    determining whether a reset of the control module was caused by an unexpected event;
    copying data recorded prior to said reset of the control module from a first memory location of a first memory device to a second memory location of the first memory device, and from said second memory location to at least one of a non-volatile memory device and an external tool for analysis, if said reset was caused by an unexpected event.

2. The method of claim 1, further comprising running periodic task processes of the control module.

3. The method of claim 1, wherein said copying data from said second memory device to said non-volatile memory device includes copying data from a SRAM device to a ROM device.

4. The method of claim 1, further comprising copying data from a microprocessor to the first memory device if said reset was caused by an unexpected event.

5. The method of claim 1, further comprising resetting the control module after said step of copying data from a first memory location of the first memory device to a second memory location of the first memory device.

6. The method of claim 1, further comprising running a defined logic program after said determining step if said reset was not caused by an unexpected event.

7. The method of claim 1, further comprising receiving a vehicle ignition signal.

8. A method for responding to a control module failure comprising:
    initializing the control module;
    determining whether a reset of the control module was caused by an unexpected event;
    after said determining step, copying data recorded prior to said reset of the control module from a first memory device to a second non-volatile memory device if the reset was caused by an unexpected event;
    transmitting the data recorded prior to said reset of the control module to an external tool for analysis;
    running periodic task processes of the control module; and
    after said determining step, copying the data recorded prior to said reset of the control module from a first memory location of the first memory device to a second memory location of the first memory device if said reset was caused by an unexpected event.

9. The method of claim 8, wherein said copying the data recorded prior to said reset of the control module includes copying data from a SRAM device to a ROM device.

10. The method of claim 8, further comprising copying data from a microprocessor to a SRAM device if said reset was caused by an unexpected event.

11. The method of claim 8, further comprising resetting the control module after said step of copying data from said first memory location of the first memory device to said second memory location of said first memory device.

12. The method of claim 8, further comprising running a defined logic program after said determining step if said reset was not caused by an unexpected event.

13. The method of claim 8, further comprising receiving a vehicle ignition signal.

14. A method for responding to a control module failure comprising:
    receiving a vehicle ignition signal;
    initializing the control module;
    determining whether a reset of the control module was caused by an unexpected event;
    after said determining step, copying data recorded prior to said reset of the control module from a SRAM device to a non-volatile memory device if the reset was caused by an unexpected event;
    transmitting the data recorded prior to said reset of the control module to an external tool for analysis;
    running periodic task processes of the control module;
    after said determining step, copying the data recorded prior to said reset of the control module from a first memory location of the SRAM device to a preserved memory location of the SRAM device if said reset was caused by an unexpected event.
    after said determining step, running a defined logic program if said reset was not caused by an unexpected event; and
    resetting the control module.

* * * * *